United States Patent
Uzkan

[19]

[11] Patent Number: 6,006,731
[45] Date of Patent: Dec. 28, 1999

[54] LOCOMOTIVE ENGINE COOLING SYSTEM

[75] Inventor: Teoman Uzkan, Indian Head Park, Ill.

[73] Assignee: General Motors Corporation, Detroit, Mich.

[21] Appl. No.: 08/972,189

[22] Filed: Nov. 18, 1997

[51] Int. Cl.$^6$ .................................................. F02B 33/00
[52] U.S. Cl. ......................... 123/563; 123/41.29; 60/599
[58] Field of Search .............................. 60/599; 123/563, 123/41.29, 41.31

[56] References Cited

U.S. PATENT DOCUMENTS

| | | | |
|---|---|---|---|
| 3,397,684 | 8/1968 | Scherenberg | 60/599 |
| 4,061,187 | 12/1977 | Rajasekaran et al. | 165/107 |
| 4,961,404 | 10/1990 | Itakura et al. | 123/41.31 |
| 5,353,757 | 10/1994 | Susa et al. | 123/41.29 |
| 5,598,705 | 2/1997 | Uzkan | 60/599 |

FOREIGN PATENT DOCUMENTS

653 642   10/1991   Australia .
950020    2/1964   United Kingdom .

*Primary Examiner*—Noah P. Kamen
*Attorney, Agent, or Firm*—Dean L. Ellis; Robert M. Sigler

[57] ABSTRACT

A locomotive engine cooling system has a pair of radiator banks having substantially the same cooling capacity. The system has separate engine and aftercooler coolant loops and assigns one of the radiator banks exclusively to each of the loops, with the maximum cooling capacity being less than that required to absorb an engine heat load in a predetermined, warmed-up mode of operation but greater than that required to absorb an aftercooler heat load in the same predetermined, warmed-up mode of operation. To balance the system, a linking conduit directs a portion of the hot coolant exiting the engine to a conduit leading directly to the aftercooler radiator to supplement the maximum cooling capacity of the engine radiator with a predetermined portion of the maximum cooling capacity of the aftercooler radiator in absorbing the engine heat load. A return flow conduit from the aftercooler radiator to the engine may be a common coolant tank, a separate conduit or both. A valved conduit in parallel with the linking conduit selectively provides additional coolant flow from the engine to the aftercooler radiator to absorb additional heat from the engine for engine temperature limiting at higher loads and/or ambient temperatures. The arrangement simplifies connections to the radiators for reduced cost, improves cooling system efficiency, reduces thermal stresses in the radiators, and permits linking valve operation in a preferred closed condition in normal, warmed-up operation.

5 Claims, 3 Drawing Sheets

LOCOMOTIVE ENGINE COOLING SYSTEM

TECHNICAL FIELD

The field of this invention is cooling apparatus for a locomotive engine.

BACKGROUND OF THE INVENTION

Most modern railroad locomotives are of the diesel-electric variety, in which a diesel engine drives electrical generating apparatus to power one or more electric motors to turn the locomotive wheels. The engine is typically turbocharged and includes an aftercooler to remove the heat of compression from the turbocharged air before it enters the engine. The engine cooling system, which circulates a liquid coolant through an engine coolant loop to remove heat from the engine, is supplemented by an aftercooler coolant loop to remove heat from the aftercooler.

U.S. Pat. No. 5,598,705, Turbocharged Engine Cooling Apparatus, issued Feb. 4, 1997, describes cooling apparatus for a diesel electric locomotive which employs separate engine and aftercooler coolant loops, each with its own radiator and pump apparatus and separate coolant conduits but sharing a single coolant tank. The loops are also connected by a linking conduit connecting the outlet of the aftercooler radiator with the inlet of the engine coolant pump. A valve in the linking conduit can be closed to prevent linking coolant flow; and the system is designed to operate in that manner under normal conditions, with the engine radiator and conduits sized to provide sufficient cooling for the engine and optional oil cooler in normal, warmed up operation while the aftercooler radiator provides cooling of the turbocharged air for maximum fuel economy and low emissions. The engine radiator is not designed to provide sufficient engine cooling for extremely hot running conditions, but the valve can be opened as necessary in such conditions to admit low temperature coolant from the aftercooler coolant loop to the engine cooling loop for extra engine cooling, with return flow through the coolant tank.

In such a locomotive engine, however, the engine provides a much greater heat load than the aftercooler; and such a cooling system designed for operation under normal conditions with a closed linking valve thus requires significantly greater cooling capacity in the engine radiator than in the aftercooler radiator. Due to size and shape constraints in the crowded locomotive body, it is customary to provide the radiators in two long, narrow banks of equal size, the banks being aligned side by side and extending fore/aft with respect to the locomotive, as seen in FIG. 2 of this document. Several fans are positioned above the radiator banks to maintain and control cooling air flow through the radiators; and efficient design dictates that these fans are arranged in a fore/aft alignment over the radiator banks and that each affects air flow through both radiator banks simultaneously. The flow tubes of each radiator bank are divided between the engine and aftercooler coolant loops in a ratio (e.g. 3:1) determined to provide a greater cooling capacity in the engine coolant loop than in the aftercooler coolant loop, so as to balance the different heat loads in normal, warmed up operation. This requires a conduit arrangement to provide coolant from each loop through portions of each radiator bank; and this arrangement is complex and expensive due to the extra pipes and expansion joints required.

The conduction of coolant from each loop to each radiator bank also produces thermal stresses in the radiator banks which must be limited. The flow tubes of a radiator bank are attached at each end to plates; and thermally induced elongations of the tubes will differ between those tubes conducting hotter coolant from the engine coolant loop and cooler coolant from the aftercooler coolant loop. Such different elongations produce rotational torques on the end plates which stress the tube/plate joints and can thus cause radiator damage if the temperature difference between the engine and aftercooler coolant loops becomes too great. The need to limit this temperature difference is a control constraint that places an otherwise unnecessary limit on the use of the aftercooler to increase fuel economy and decrease undesirable emissions at cooler temperatures and thus prevents optimal operation of the engine.

This cost and complexity in flow conduits and control limitations could be reduced or eliminated if one of the radiator banks were dedicated totally to the engine coolant loop and the other were dedicated totally to the aftercooler coolant loop. But this would unbalance the system, since the engine would provide a heat load to the engine radiator bank up to three times greater than the aftercooler provided to the aftercooler radiator bank of similar size and cooling capacity. In addition, the flow tubes of the radiator banks have a maximum flow rate, beyond which they are subject to cavitation damage. Therefore, assuming the system has been designed for coolant flow rates making efficient use of the radiator banks, the larger heat load provided to the engine radiator bank can not be absorbed by further increasing the coolant flow rate through the bank. Thus, the system as described would have insufficient cooling capacity in the engine cooling loop and unused excess cooling capacity in the aftercooler cooling loop to operate with the linking valve closed in normal, warmed up operation. Although the linking valve could be kept open in normal operation to provide linking coolant flow for additional engine cooling, this is not desirable. The linking valve used in the aforementioned system is typically a ball type valve; and extended operation in a single, partly opened position tends to shorten the life span of such a valve. Furthermore, such operation would reduce the operational control range of the valve and allow the possibility of engine overheating if the valve is accidentally closed completely. Moreover, the system as a whole is not optimally designed for such operation. All coolant exiting the engine passes through and is cooled by the engine radiator before being mixed with coolant from the aftercooler; and the hottest coolant in the system, which is found at the outlet of the engine, is thus not directly involved in the mixing. This can produce hotter engine temperatures for a given linking valve opening and slower response to increasing engine temperature.

SUMMARY OF THE INVENTION

The locomotive engine of this invention has an engine coolant loop with an engine pump and an engine radiator and an aftercooler coolant loop with an aftercooler pump and an aftercooler radiator. The engine and aftercooler radiators have substantially the same maximum cooling capacity, which is less than that required to absorb an engine heat load in a predetermined, warmed-up mode of operation but is greater than that required to absorb an aftercooler heat load in the same predetermined, warmed-up mode of operation.

The engine has a first linking conduit from the engine coolant loop between the engine and the engine radiator to the aftercooler coolant loop between the aftercooler and the aftercooler radiator. The first linking conduit provides direct coolant flow from the engine to the aftercooler radiator at all times to supplement the maximum cooling capacity of the engine radiator with a predetermined portion of the maximum cooling capacity of the aftercooler radiator in absorbing the engine heat load. A second linking conduit from the aftercooler coolant loop between the aftercooler radiator and the aftercooler pump to the engine coolant loop between the engine radiator and the engine pump provides return coolant flow from the aftercooler radiator to the engine. A third linking conduit in parallel with the first linking conduit has a valve openable in response to a temperature signal to selectively provide additional direct coolant flow from the engine to the aftercooler radiator to absorb additional heat from the engine for engine temperature limiting.

The second linking conduit may comprise a coolant tank connected as a reservoir to both coolant loops, a direct conduit between the coolant loops upstream from the pumps, or both in parallel. If the direct conduit is used, the coolant tank need only communicate directly with one of the coolant loops.

The arrangement allows simplification of the conduits connecting the radiators in the coolant loops for significant cost savings by elimination of duplicate pipes and expansion joints. Furthermore, it improves cooling system efficiency by carrying heat from the engine by coolant directly to the excess cooling capacity of the aftercooler radiator. In addition, by providing coolant to each radiator at only one temperature so that all flow tubes of a radiator bank elongate equally, it reduces thermal stresses in the radiators to allow greater temperature differences between the engine and aftercooler coolant loops for optimal fuel economy and emissions and to reduce the possibility of radiator damage. Moreover, it permits linking valve operation in a preferred closed condition in normal, warmed-up operation to maintain valve life span.

BRIEF DESCRIPTION OF THE DRAWINGS

The present invention will be described, by way of example, with reference to the accompanying drawings in which.

DESCRIPTION OF THE PREFERRED EMBODIMENT

Figure 1:
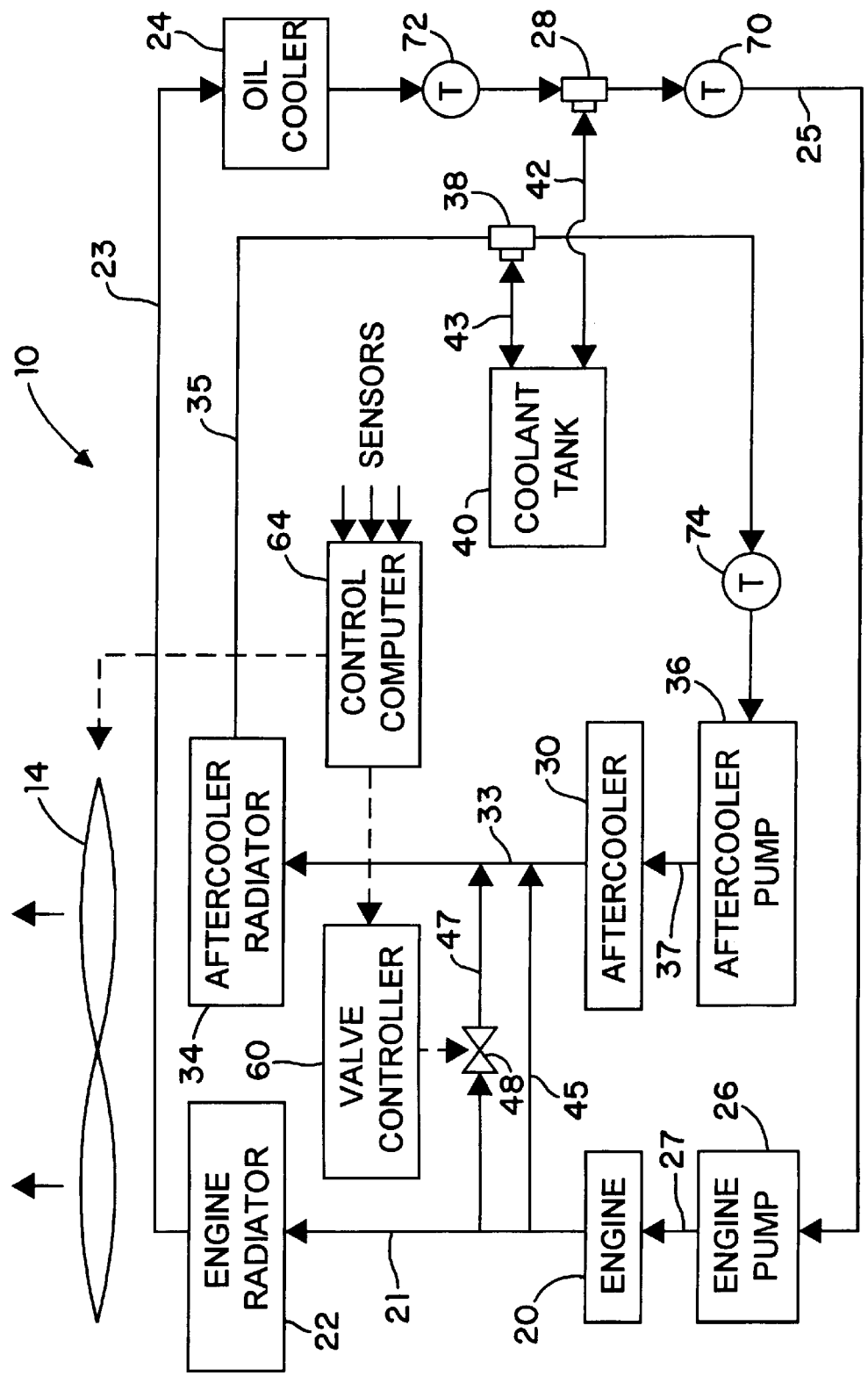
FIG. 1 shows a representative embodiment of an engine cooling system according to the invention in block diagram form.

An example of a preferred embodiment of this invention is shown as a block diagram in FIG. 1. A diesel engine 20 for a locomotive 10 has a turbocharger having an aftercooler 30 for cooling the compression heated air charge provided to the engine combustion chambers. Engine 20 has internal coolant passages connected in an engine coolant loop also including, in order of coolant flow, an engine radiator 22, an optional oil cooler 24 and an engine pump 26, connected by coolant conduits 21, 23, 25 and 27 as shown. Liquid coolant such as water, propylene glycol, ethylene glycol or a mixture thereof is circulated by engine pump 26 to remove heat from engine 20 and, optionally, oil cooler 24 and give up the heat to the environment through engine radiator 22. Aftercooler 30 has internal coolant passages connected in an aftercooler coolant loop also including, in order of coolant flow, an aftercooler radiator 34 and an aftercooler pump 36, connected by coolant conduits 33, 35 and 37 as shown. Liquid coolant is similarly circulated by aftercooler pump 36 to remove heat from aftercooler 30 and give up the heat to the environment through aftercooler radiator 34. The temperature of coolant in the aftercooler coolant loop is generally lower than that in the engine coolant loop. A coolant tank 40 is connected by a conduit 42 to an optional aspirator 28 in coolant conduit 25 upstream of pump 26 in the engine coolant loop and through a conduit 43 to an optional aspirator 38 in coolant conduit 35 upstream from pump 36 in the aftercooler loop. Coolant tank 40 is a reservoir from which needed coolant is drawn or to which excess coolant sent by either of the loops.

Figure 2:
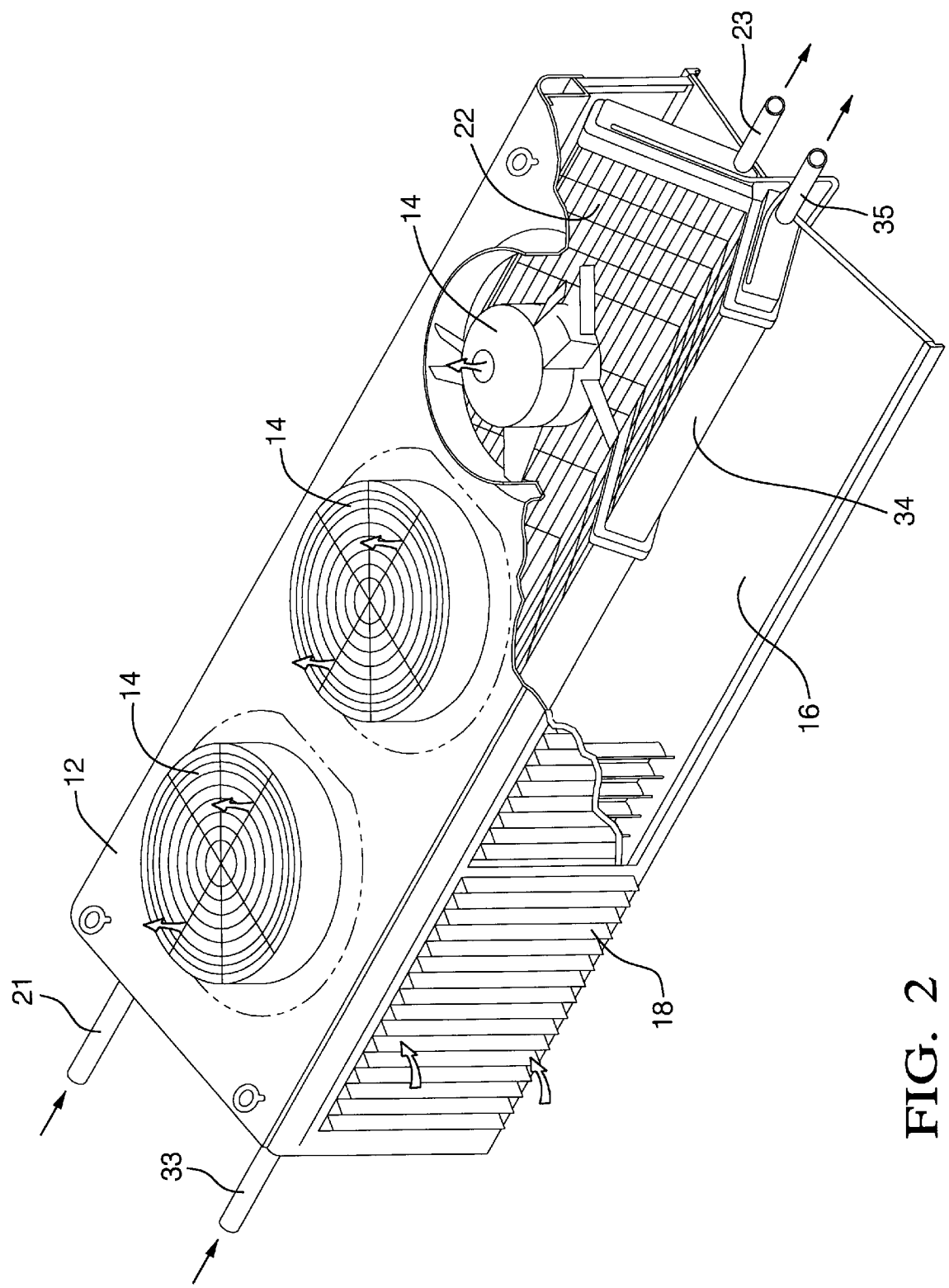
FIG. 2 is a perspective view of a radiator, fan and shutter apparatus for use in the engine cooling system of FIG. 1.

FIG. 2 shows a typical radiator apparatus for the system of FIG. 1. This apparatus is typically located above other equipment near the rear of the locomotive. The engine radiator 22 and the aftercooler radiator 34 each comprise an extended radiator bank aligned lengthwise (fore/aft) with the locomotive body and set at an angle from horizontal so that the two together form an extended V-shaped arrangement. Since each radiator bank is dedicated entirely to one of the radiators 22 and 34, the terms "radiator," "radiator bank" and "bank" will be used synonymously in this description. Each bank contains a plurality of fore/aft extending flow tubes fed by manifold or similar means at the front end near the engine and drained in a similar manner at the back end, relative to the locomotive. The interior of radiators 22 and 34 is not shown, since the their construction is standard and well known in the art. The flow tubes are attached at each end to an end plate. One of the end plates is fixed in position, but the other is allowed to move as the tubes expand and contract in length with varying temperature. Coolant is fed to radiators 22 and 34 through coolant conduits 21 and 33, respectively. Likewise, coolant exits radiators 22 and 34 through coolant conduits 23 and 35, respectively. One or both of the coolant conduits connected to each radiator may be provided with an expansion joint to allow for thermal expansion and contraction with changing coolant temperature.

Radiators 22 and 34 are located adjacent a roof 12 of the locomotive, in which is set a plurality of fans 14—three in this embodiment—which draw air upward through the radiators and exhaust the heated air vertically upward out of the locomotive body. A horizontal member 16 defines an air box below the radiators; and rotatable, vertical shutters 18 in the walls allow control of airflow into the air box. The angle of the radiator banks from the horizontal in their V-shaped arrangement allows external air to be drawn by the fans horizontally through the shutters into the air box and then on an angle upward through the radiator banks sloped for the maximum possible flow area within the box.

The fans 14 are large in diameter and lined up fore/aft with respect to the locomotive body so as to provide the most even and efficient possible air flow through the box. Fans 14 are individually controlled and, together with the shutters, used to vary airflow through the radiators in a stepped manner; but each step applies its change in air flow to both radiators 22 and 34 simultaneously. Since the radiator banks are also essentially the same size, they will provide essentially identical cooling capacity, at each step of the fans and shutters, to the coolant flowing through each; and the engine radiator will thus tend to be deficient in cooling capacity relative to the engine heat load while the aftercooler radiator has excess cooling capacity for the corresponding aftercooler heat load.

In order to provide the extra cooling capacity of aftercooler radiator 34 for engine 20 in normal, warmed up engine operation, a bypass conduit 45 is provided between coolant conduit 21 downstream from engine 20 and coolant conduit 33 upstream from aftercooler radiator 34. A higher coolant pressure is maintained by pump 26 in the engine coolant loop than by pump 36 in the aftercooler coolant loop; and the greater pressure in coolant conduit 21 thus causes a portion of the coolant from engine 20 to flow through bypass conduit 45 to the lower pressure coolant conduit 33, in which it mixes with lower temperature coolant from the aftercooler. The coolant flowing from coolant conduit 33 into aftercooler radiator 34, which contains the additional heat from engine 20 and is thus somewhat elevated in temperature from that exiting aftercooler 30 is cooled in aftercooler radiator 34. A return flow is created as a portion of the output of aftercooler radiator 34 flows from coolant conduit 35 through conduit 43, coolant tank 40 and coolant conduit 42 to coolant conduit 25 at the input of engine pump 26. Thus, a portion of the heat of engine 20, from the hottest point in the system, is carried by coolant directly to aftercooler radiator 34 with its excess cooling capacity; and a portion of the coolant exiting aftercooler radiator 34, at the coolest point in the system, is provided directly back through engine pump 26 to engine 20.

The conduits are sized to provide a predetermined proportion of the total coolant exiting engine 20 to bypass conduit 45 so that radiators 22 and 34 together will absorb a predetermined engine heat load generated in engine operation at a predetermined, warmed up engine load and ambient temperature. For example, at 22 degrees C ambient, with a predetermined normal load and a preferred engine operating temperature of 79 degrees C, coolant conduits 21, 23, 25 and 27 of the engine coolant loop may, for example, have a 4 inch diameter; and coolant conduits 33, 35 and 37 of the aftercooler coolant loop may a 3 inch diameter. Coolant bypass conduit 45 may be provided with a ¾ inch diameter, and coolant conduits 42 and 43 from coolant tank 40 may have a 2 inch diameter. Given certain predetermined operating pressures produced by pumps 26 and 36, coolant bypass conduit 45 will direct a proportion of the total coolant flow from engine 20 into the aftercooler coolant loop sufficient to rid the engine coolant loop of the excess engine (and oil cooler, if applicable) heat load which cannot be absorbed by engine radiator 22.

In order to provide additional linking for higher engine loads and/or hotter ambient temperatures or as part of an optimized control between discrete levels of fan operation, a linking conduit 47 with a linking valve 48 may be placed in parallel with bypass conduit 45. Linking conduit 47 may have a diameter of 2 inches, but its effective flow area will be controlled by valve 48. Linking valve 48 is controllable by a valve actuator 60 in a continuous or a stepped manner between a fully closed and a fully open position. With valve 48 fully closed, the system operates with only bypass conduit 45 providing linking flow sufficient to provide absorption of the predetermined engine heat load. If engine load and/or ambient temperatures increase, valve 48 may be opened to provide additional coolant from engine 20 to aftercooler radiator 34 and thus further share the cooling capacity of aftercooler radiator 34 with the engine coolant loop. With valve 48 fully open, substantial sharing of cooling capacity occurs between the loops and the temperatures of coolant in the two loops are substantially equal. Linking valve 48 is preferably a ball type valve. Such valves have parts which can be deformed by valve operation for an extended time in a partly open position, but the operational life of such valves in this system is maximized by the fact that the valve is closed in normal, warmed-up operation. When the valve is opened to provide additional engine cooling or to smooth cooling control between discrete fan steps, it is generally not kept in one position for an extended time.

Valve actuator 60 is responsive to a control computer 64, which is preferably a standard programmed digital computer and which may also control the speeds of fans 14 and positions of shutters 18. Control computer 64 may be responsive to one or more coolant temperature sensors located in either coolant loop and/or an ambient temperature sensor. For example, control computer 64 may be responsive to a temperature sensor 70 located at the inlet of engine pump, downstream from aspirator 28, to sense the temperature of the mixed coolant and vary the fans and shutters in discrete cooling steps upward and downward in closed loop to maintain a generally constant temperature. The computer may also be responsive to the same temperature sensor to open linking valve 48 when the indicated engine coolant temperature becomes too high with the shutters fully open and the fans providing maximum airflow. In another control strategy, the linking valve may be used as a supplement to the fan steps at normal operating temperatures to smooth passage from one discrete fan step to the next. Another coolant temperature sensor 72 in coolant conduit 25 between oil cooler 24 and aspirator 28 provides a second coolant temperature signal just upstream from the point of addition of coolant from the aftercooler loop to indicate "unmixed" engine coolant temperature for additional control information. Control 64 may, for example, determine the amount of linking between the engine and aftercooler coolant loops from the difference in temperatures sensed by sensors 70 and 72. Control computer 64 may be further responsive to an additional coolant temperature sensor 74 in coolant conduit 35 and/or to an ambient air temperature sensor, not shown.

Although the system of this invention is basically concerned with getting rid of the large heat load of the engine at normal to high temperatures, it also provides a benefit in operation at cooler operating temperatures. The function of the aftercooler is to cool and thus condense the air provided with the fuel charge to the engine for better fuel economy and lower undesirable emissions. The system of this invention allows the aftercooler to be operated at a lower temperature than the prior art system previously described when the engine is cooler than normal. As previously mentioned, aftercooler radiator 34 has significantly greater cooling capacity than is required for aftercooler cooling when the engine is operating in normal, warmed up conditions. At such time the excess cooling capacity of aftercooler radiator 34 is used for engine cooling. But when the engine heat load is lower, part of the excess cooling capacity of aftercooler radiator 34 is available for additional aftercooler cooling. In the prior art systems, the aftercooler temperature could not be allowed to fall more than a predetermined amount less than the engine temperature, due to stresses in the radiator banks. But in the system of this invention, with each radiator receiving coolant at a single temperature, such stresses are greatly reduced; and the temperature of the aftercooler may be allowed to fall significantly lower, with the limit being determined by coolant freezing. Thus, in some operational modes, the system of this invention provides better fuel economy and lower undesirable emissions.

Figure 3:
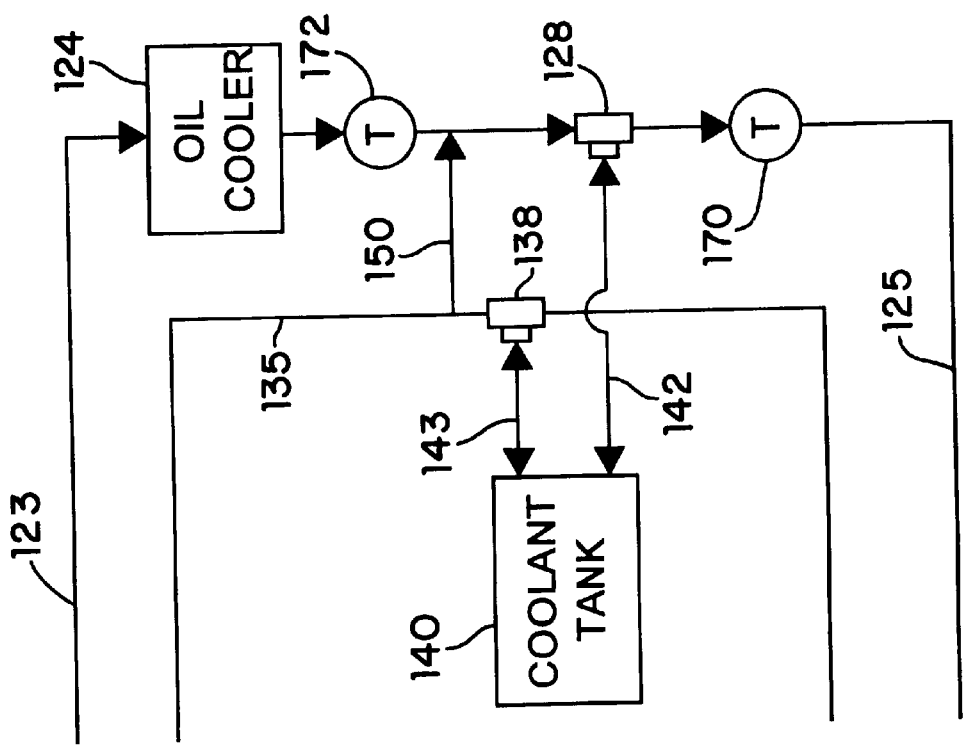

FIG. 3 is a partial block diagram of an alternative embodiment of this invention, with the figure showing the part of the embodiment which differs from the embodiment of FIG. 1. Elements of FIG. 3 are given reference numerals 100 higher than their corresponding elements of FIG. 1; and the part of the alternative embodiment not shown in FIG. 3 is essentially the same as the arrangement of FIG. 1. In FIG. 3, coolant tank 140 communicates with coolant conduit 135 of the aftercooler coolant loop through coolant conduit 143 and aspirator 138. Likewise, coolant tank 140 communicates with coolant conduit 125 of the engine coolant loop through a coolant conduit 142 and aspirator 128. Coolant tank 140 thus provides a coolant return path from the aftercooler coolant loop to the engine coolant loop just as it does in the system of FIG. 1. But in the system of FIG. 3, a parallel return path is provided in coolant conduit 150, which connects coolant conduits 135 and 125 just upstream from the aspirators and downstream from optional temperature sensor 172. The coolant return path thus comprises both coolant tank 140 and coolant conduit 150 in parallel. The use of coolant conduit 150 allows the use of smaller aspirators 128 and 138 and also provides a more direct path for return flow which bypasses coolant tank 140. Thus, the coolant will pick up less air from the coolant tank and will have less tendency to cavitate in the pumps.

Figure 4:
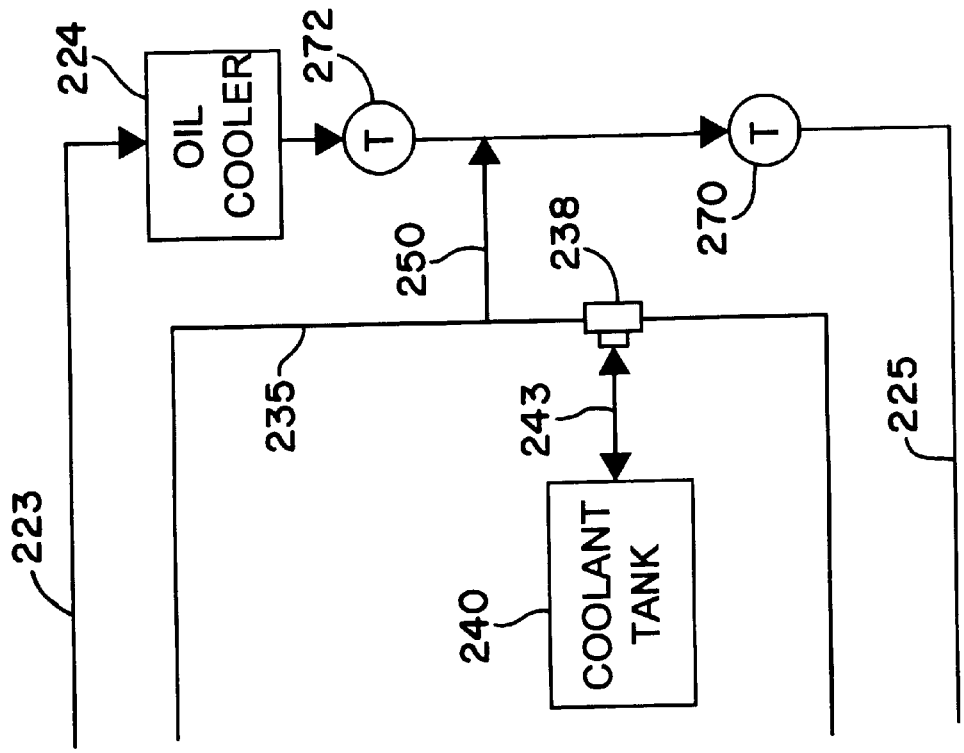
FIGS. 3 and 4 are partial block diagrams of alternative embodiments to the system of FIG. 1.

FIG. 4 is a partial block diagram of an alternative embodiment of this invention, with the figure showing the part of the embodiment which differs from the embodiment of FIG. 1. Elements of FIG. 4 are given reference numerals 200 higher than their corresponding elements of FIG. 1; and the part of the alternative embodiment not shown in FIG. 4 is essentially the same as the arrangement of FIG. 1. In FIG. 4, coolant tank 240 communicates with coolant conduit 235 of the aftercooler coolant loop through coolant conduit 243 and aspirator 238. Similarly to FIG. 3, coolant conduit 250 links coolant conduit 235 of the aftercooler coolant loop with coolant conduit 225 of the engine coolant loop. But the embodiment of FIG. 4 eliminates the direct connection of the coolant tank to the engine coolant loop: coolant tank 240 provides coolant as needed to the engine coolant loop indirectly through coolant conduit 250. In this embodiment, coolant conduit 250 is the coolant return path from the aftercooler coolant loop to the engine coolant loop.

I claim:

1. A locomotive diesel engine having coolant passages therethrough and a turbocharger with an aftercooler having coolant passages therethrough, the engine generating an engine heat load in a predetermined, warmed-up mode of operation, the aftercooler generating an aftercooler heat load in the predetermined, warmed up mode of operation, the engine heat load being substantially greater than the aftercooler heat load, the engine further having cooling apparatus comprising:

an engine coolant loop comprising an engine pump, an engine radiator and an engine coolant conduit connecting the engine pump, the coolant passages of the engine and the engine radiator for unidirectional circulation of a liquid coolant, the engine radiator having a maximum cooling capacity less than that required to absorb the engine heat load;

an aftercooler coolant loop comprising an aftercooler pump, an aftercooler radiator and an aftercooler coolant conduit connecting the aftercooler pump, the coolant passages of the aftercooler and the aftercooler radiator for unidirectional circulation of the liquid, the aftercooler radiator having substantially the same maximum cooling capacity as the engine radiator, the maximum cooling capacity being greater than that required to absorb the aftercooler heat load;

a first linking conduit from the engine coolant loop between the engine and the engine radiator to the aftercooler coolant loop, between the aftercooler and the aftercooler radiator, the first linking conduit providing direct coolant flow from the engine to the aftercooler radiator at all times to supplement the maximum cooling capacity of the engine radiator with a predetermined portion of the maximum cooling capacity of the aftercooler radiator in absorbing the engine heat load;

a second linking conduit from the aftercooler coolant loop between the aftercooler radiator and the aftercooler pump to the engine coolant loop between the engine radiator and the engine pump for providing return coolant flow from the aftercooler radiator to the engine; and a third linking conduit in parallel with the first linking conduit and comprising a valve openable in response to a temperature signal to selectively provide additional direct coolant flow from the engine to the aftercooler radiator to absorb additional heat from the engine for engine temperature limiting.

2. The internal combustion engine of claim 1 in which the second linking conduit comprises a common coolant tank communicating with the inlets of both the main pump and the aftercooler pump.

3. The internal combustion engine of claim 1 further having a common coolant tank communicating with the inlets of both the main pump and the aftercooler pump in addition to a separate conduit from the aftercooler coolant loop between the aftercooler radiator and the aftercooler pump to the engine coolant loop between the engine radiator and the engine pump, wherein the common coolant tank and the separate conduit together provide return coolant flow from the aftercooler radiator to the engine.

4. The internal combustion engine of claim 1 further having a common coolant tank communicating directly with the inlet of only one of the aftercooler pump and the engine pump.

5. The internal combustion engine of claim 4 in which the common coolant tank communicates directly with the inlet of only the aftercooler pump.

* * * * *